T. R. BINGHAM.
ANTISKID DEVICE.
APPLICATION FILED FEB. 11, 1921.
1,412,832.
Patented Apr. 18, 1922.
2 SHEETS—SHEET 2.
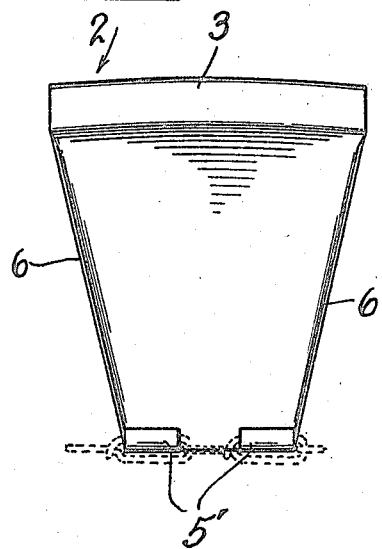
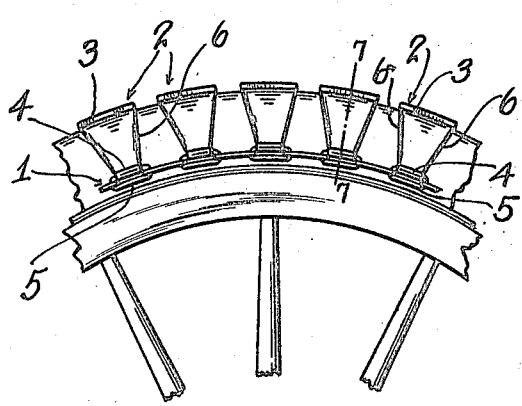
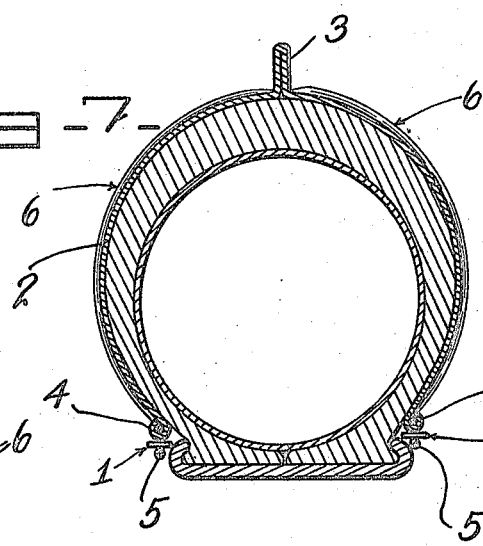
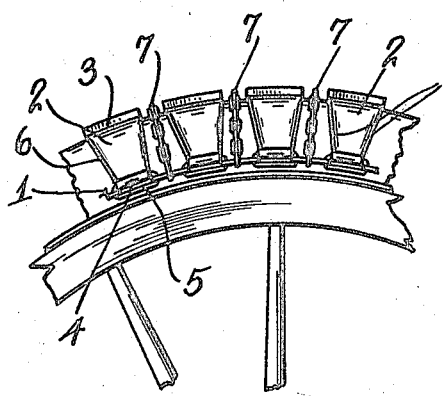
Inventor
T. R. Bingham
By L. B. James
Attorney

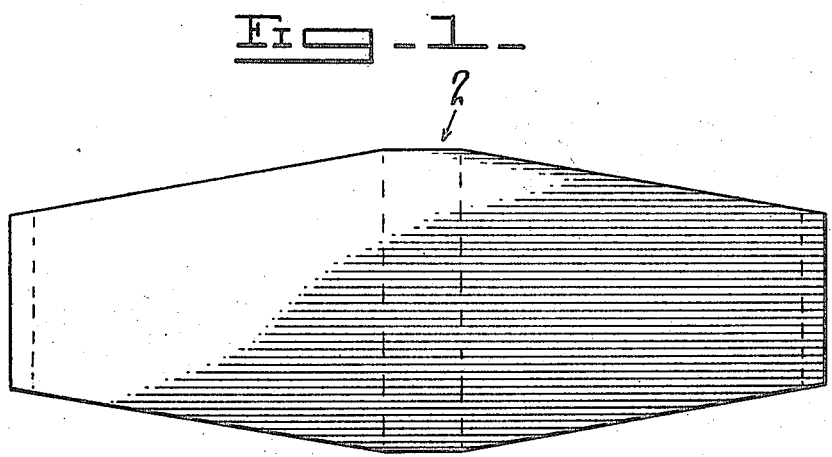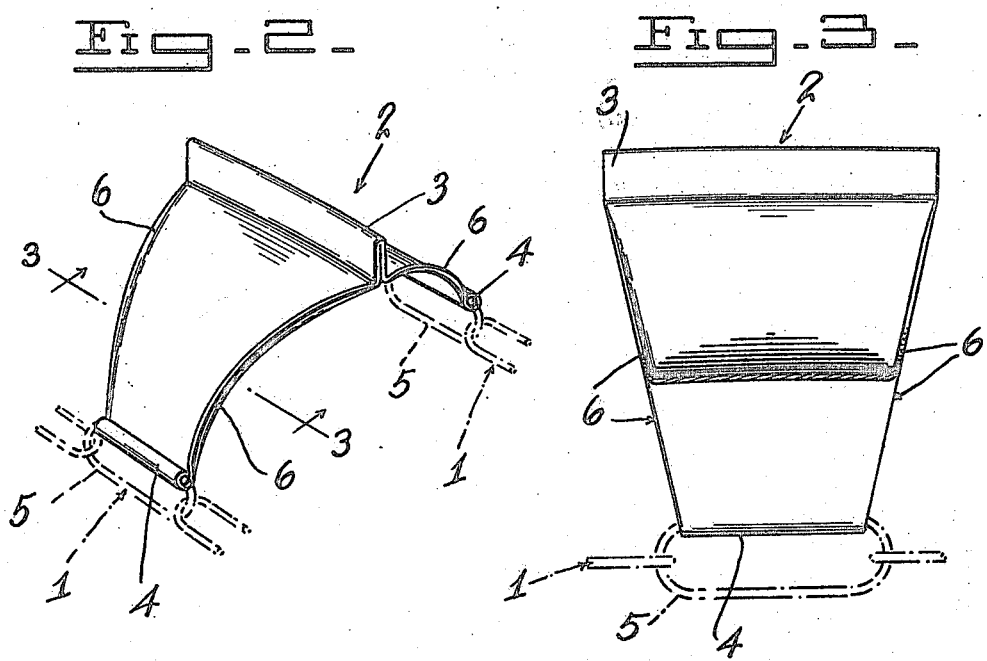

UNITED STATES PATENT OFFICE.

THERON R. BINGHAM, OF ENID, OKLAHOMA.

ANTISKID DEVICE.

1,412,832. Specification of Letters Patent. Patented Apr. 18, 1922.

Application filed February 11, 1921. Serial No. 444,144.

*To all whom it may concern:*

Be it known that I, THERON R. BINGHAM, a citizen of the United States, residing at Enid, in the county of Garfield and State of Oklahoma, have invented certain new and useful Improvements in Antiskid Devices, of which the following is a specification.

This invention relates to anti-skid devices for vehicle wheels, the general object of the invention being to provide means for not only preventing the device from skidding but also to provide means for increasing the traction so that a vehicle supplied with my invention can travel along muddy roads and the like without difficulty.

Another object of the invention is to provide a plurality of shoe elements each constructed to embrace a portion of the tire with flexible means for connecting the elements together and each element also having a flange on its tread part which extends circumferentially.

Still another object of the invention is to provide cross chains which are located between the shoe elements to increase the traction effect.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of a blank from which a shoe element is formed.

Figure 2 is a detail perspective view of one of the shoe elements.

Figure 3 is a detail sectional view on line 3—3 of Figure 2.

Figure 4 is a side view of a modified form of shoe element.

Figure 5 is an enlarged side view of a portion of a wheel with one form of anti-skid device applied in operative position thereon.

Figure 6 is a similar view illustrating a modified form of anti-skid chain.

Figure 7 is an enlarged sectional view on line 7—7 of Figure 5.

As shown in these views the device comprises a pair of side chains 1 and the shoe elements 2 which have their ends connected with the side chains, the shoes extending transversely and engaging the tire and being constructed to conform to that part of the tire with which they are in engagement. The ends of the side chains are connected together in any suitable or desired manner. Each shoe 2 is constructed of a blank cut as shown in Figure 1 with a wide central part and tapering towards its ends. The central part is looped upon itself and the looped parts pressed together to form a flange 3 and then the blank is bent longitudinally to embrace the tire and the central part carrying the flange is curved to conform to the curve of the tread part of the tire, thus making the flange of arcual shape. The side edges of the shoe are rolled over to provide the eyes 4 to receive a portion of the links 5 of the side chains, these links being made large enough to receive the ends of the shoe.

In order to prevent the forward and rear edges of the shoes from cutting the tire I roll or bend outwardly said edges as shown at 6 so that said edges will not come in contact with the tire, but, on the other hand will constitute flanges disposed transversely oblique of the tire and calculated to increase the traction capacity of the shoes as well as the capacity of the same in preventing skidding.

Instead of making the eyes 4 continuous I may form a pair of these eyes at each end of each shoe as shown at 5' in Figure 4.

As shown in Figure 6 I may place cross chains 7 between the shoes, these chains having their ends connected with the side chains. Thus the traction effect is increased and the two side chains are flexibly connected together by said cross chains.

From the above it will be apparent that a vehicle equipped with my anti-skid device can travel along muddy roads and through snow and ice and sand without difficulty as the shoes and their flanges 3 and 6 prevent spinning of the wheels. These shoes also prevent skidding or side slipping and the flanges 3 also act to facilitate the guiding of the car along muddy or sandy roads by preventing side slipping and tending to keep the wheels in alignment. These flanges 3 also tend to keep the shoes in alignment. Shoes constructed in accordance with my invention also permit the car to be turned out of bad roads in order to permit another car to pass by and they also will permit cars to be used on steep side grades.

In virtue of the flanges 3 being formed in the manner shown and described, the shoes are rendered resilient transversely of the tire and hence are adapted to closely hug the tire.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

As a new article of manufacture, a shoe for tires formed of a single piece of appropriate thin sheet-material, and including side portions curved conformably to the cross-section of a tire to rest thereon and tapered to their side edges, a longitudinal central outwardly-extending flange extending continuously from end to end of the shoe and having side by side portions joined at their outer edges by a bight and merged at their inner edges into said side portions, and outwardly extending flanges on the forward and rear edges of said tapered side portions.

In testimony whereof I affix my signature.

THERON R. BINGHAM.